(12) United States Patent
Spivey (10) Patent No.: US 8,094,675 B2
(45) Date of Patent: *Jan. 10, 2012

(54) ROUTER AND METHOD FOR ROUTING DATA

(75) Inventor: Thomas Spivey, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/263,696

(22) Filed: Nov. 1, 2005

(65) Prior Publication Data
US 2007/0098011 A1    May 3, 2007

(51) Int. Cl.
*H04L 12/66* (2006.01)
(52) U.S. Cl. .................................. 370/463; 370/419
(58) Field of Classification Search .............. 370/463, 370/352, 419; 455/73–78; 361/728–730, 361/735–737, 741, 748, 752–756; 710/100, 710/305, 306, 316; 235/486, 492
See application file for complete search history.

(56) References Cited

U.S. PATENT DOCUMENTS

| 4,186,342 | A | * | 1/1980 | Kyle ............................ 455/76 |
| 5,243,344 | A | * | 9/1993 | Koulopoulos et al. ....... 341/143 |
| 5,321,813 | A | * | 6/1994 | McMillen et al. ........... 714/798 |
| 5,978,881 | A | * | 11/1999 | Lebhar ........................ 710/316 |
| 6,892,451 | B2 | | 5/2005 | Brodsky et al. |
| 7,044,393 | B2 | * | 5/2006 | Watanabe et al. ............. 235/492 |
| 2006/0114883 | A1 | * | 6/2006 | Mehta et al. ................ 370/352 |
| 2006/0232948 | A1 | * | 10/2006 | Haager et al. ................ 361/752 |

* cited by examiner

*Primary Examiner* — Andrew Lai
(74) *Attorney, Agent, or Firm* — Fish & Richardson P.C.

(57) ABSTRACT

A device and method for routing network data through a network. The device comprises an end cap assembly which includes an end cap coupled to a wiring card having an interposer board. The method includes processing a plurality of network transmissions through an end cap, and routing the network transmissions to an interposer board.

14 Claims, 10 Drawing Sheets

ROUTER AND METHOD FOR ROUTING DATA

BACKGROUND OF THE INVENTION

1. Field of Invention

The present invention broadly relates in general to a device, such as a router or switch, and the like. More specifically, embodiments of the present invention relate to a router and method for routing data in a network.

2. Description of the Background Art

It is well known that a router is a device that connects two networks (e.g., local networks or networks in the Internet) frequently over large distances. It understands one or more network protocols, such as IP or IPX. A router accepts transmitted packets (i.e., data) on at least two network interfaces, and forwards packets from one interface to another. Routers may be programmed to filter out some packets, and to dynamically change the route by which packets are routed or transmitted through a network. Routers often use different media on each interface. For instance, a router might have one Ethernet port and one ISDN port.

Routers, particularly mobile routers, have different deployment scenarios, depending on the type of data that is to be routed throughout a network. Some routers are disposed in trunks of vehicles (e.g., public safety vehicles), while others are mounted on other objects, such as traffic poles, curbside cabinets, buildings, rugged all-terrain vehicles, etc. Each of these deployments requires a unique interface to the router. In some cases native connectors for ethernet signals are required. In other cases, there is a need for rugged circular style connectors, or single ganged connectors, that carry all the signals to another location at which point they will fan out. Therefore, routers are typically custom made in accordance with the particular intended deployment. This requires vendors to possess numerous different types of router-production resources, since each customer may request a different type of router with different capabilities.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
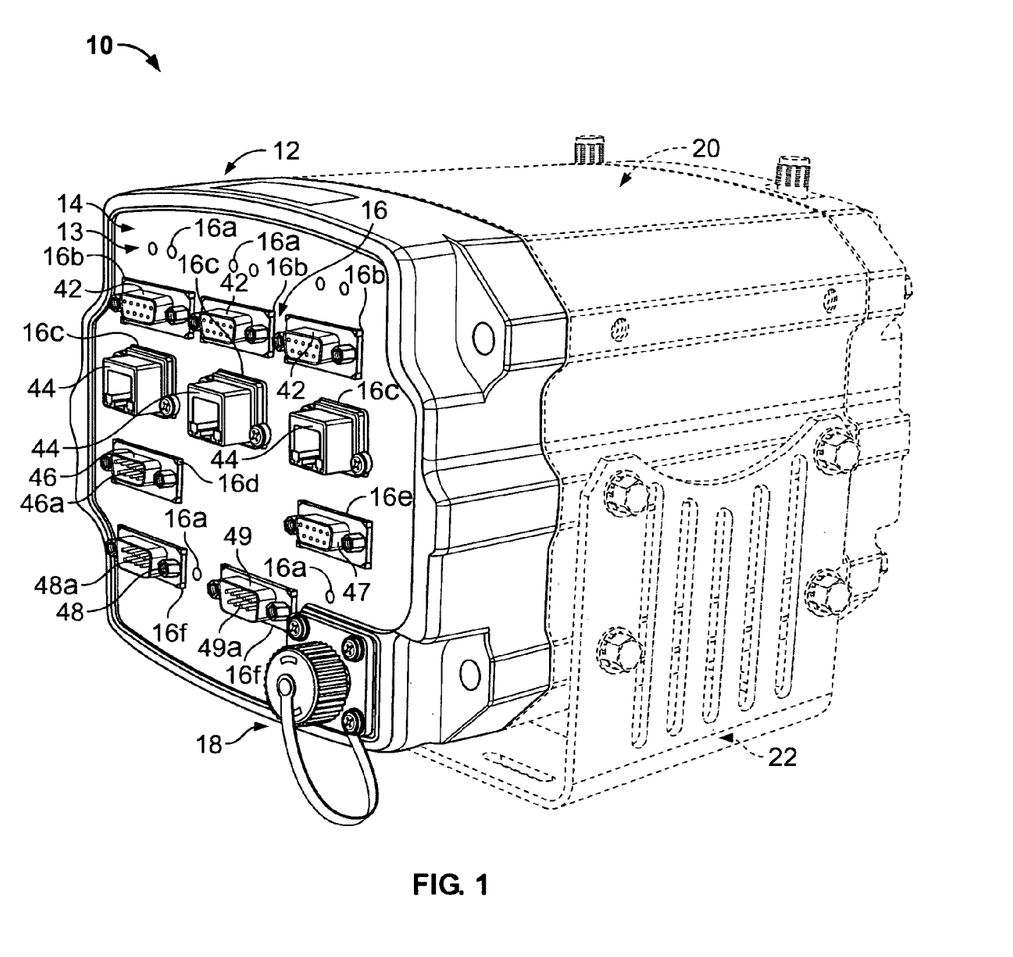
FIG. 1 is a perspective vies of an embodiment of a device (e.g., a router, switch, or the like), with the end cap assembly being represented by solid lines and with its associated body and mount being represented by dashed lines.
Figure 2:
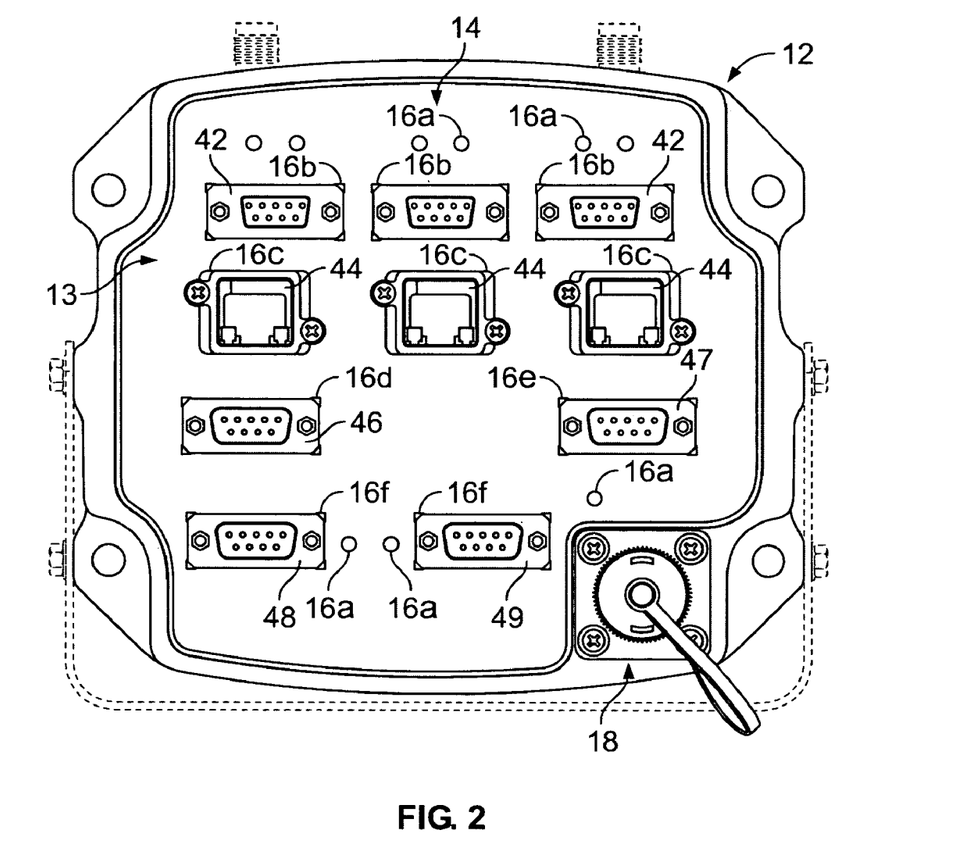
FIG. 2 is a front elevational view of the device of FIG. 1.
Figure 3:
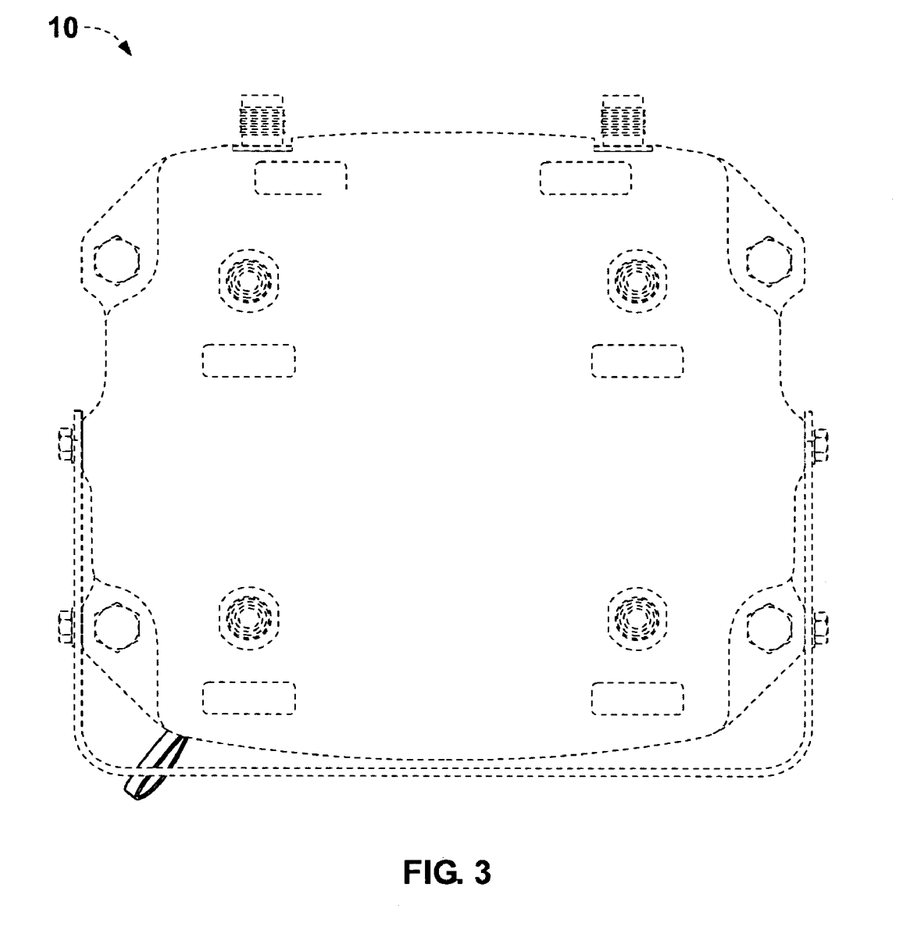
FIG. 3 is a rear elevational view of the device of FIG. 1.
Figure 4:
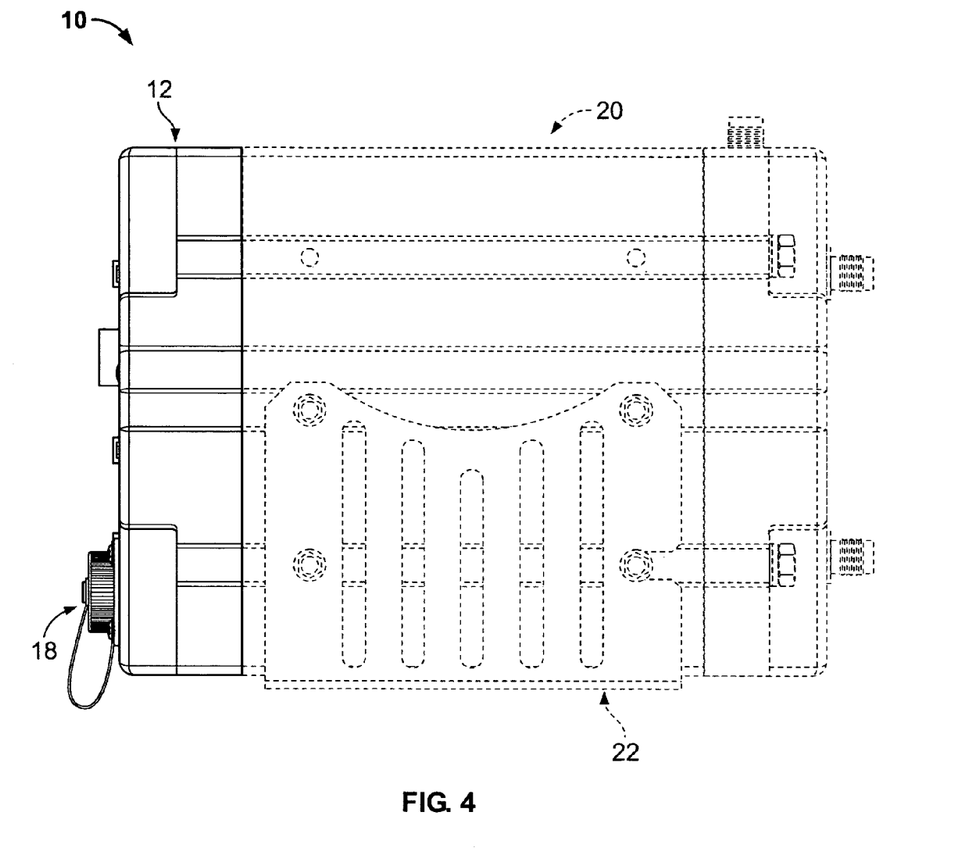
FIG. 4 is a side elevational view of the device of FIG. 1.
Figure 5:
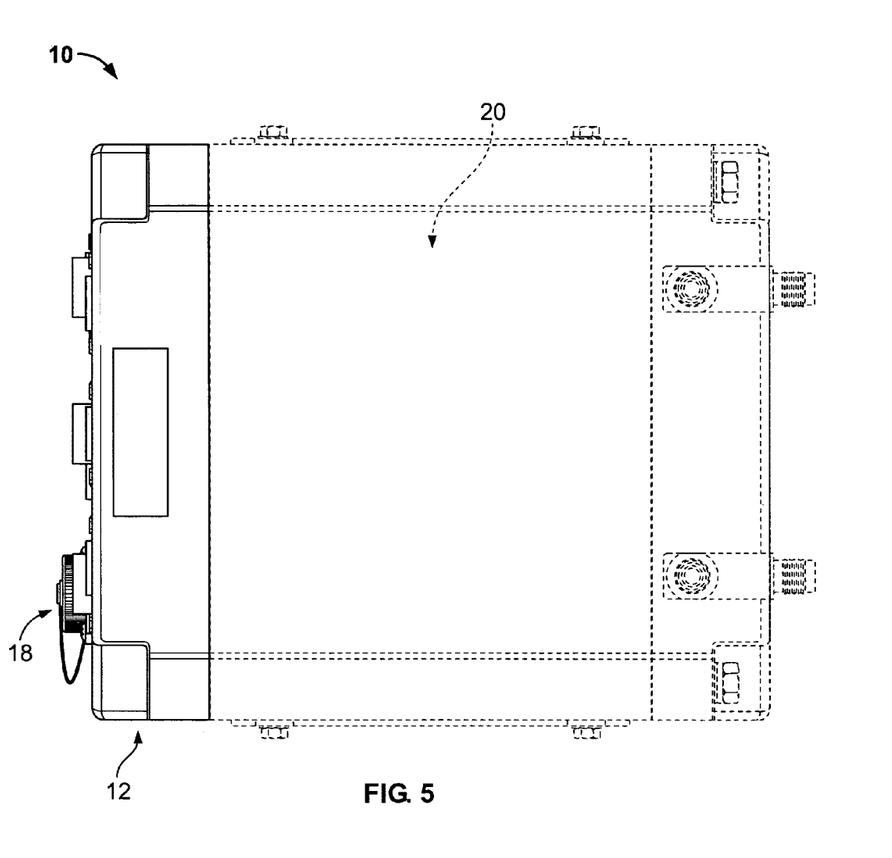
FIG. 5 is a top plan view of the device of FIG. 1.
Figure 6:
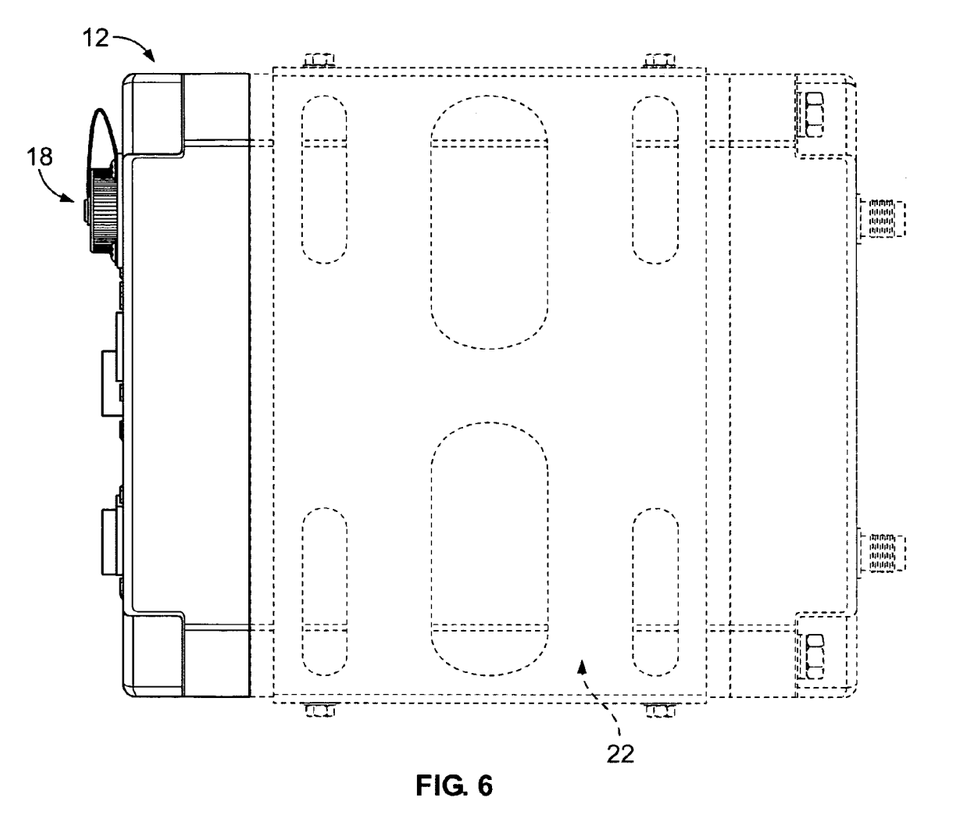
FIG. 6 is a bottom plan view of the device of FIG. 1.
Figure 7:
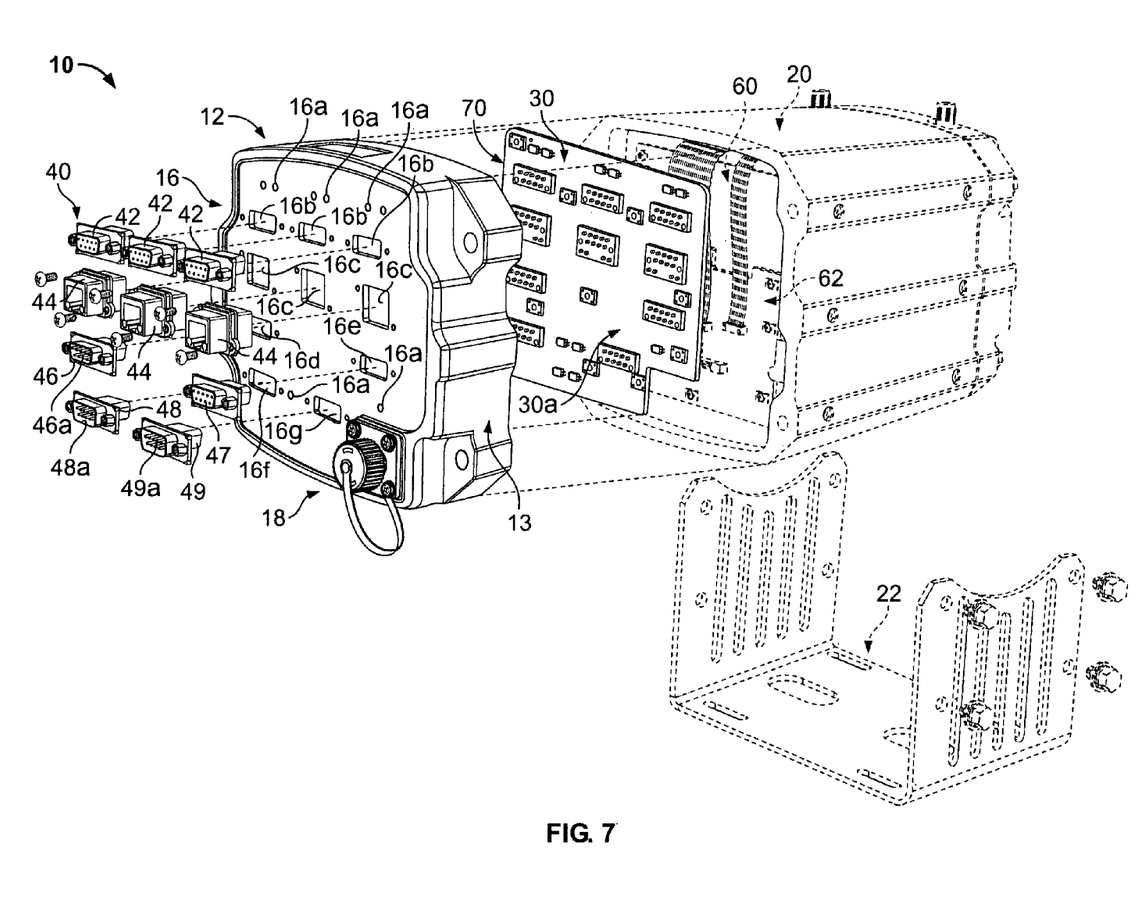
FIG. 7 is a segmented perspective view of the device of FIG. 1, with the segmented end cap assembly being represented by solid lines and with its associated segmented body and mount being represented by dashed lines.

Referring in detail now to the drawings, there is seen in FIG. 1 an embodiment of a device, generally illustrated as 10 and having an end cap assembly 12 represented by solid lines. The device 10 also includes a body 20 and a mount 22, all represented by dashed lines. The device 10 may be any device, including a router, a switch, or any other suitable device. For various embodiments of the present invention, the device 10 is a router, which may be a wireless router, or a router requiring wires for operation. Disposed within body 20, as best shown in FIG. 7 in a dashed line configuration, is a mobile interface card (MIC) stack assembly, generally illustrated as 60 and including a wiring board 62. The wiring board 62 is common between all deployment scenarios and the MIC stack assembly 60. The purpose of the wiring board 62 is to reduce the number of wiring harnesses between the MIC stack assembly 60 and the end cap assembly 12 including a wiring card (indicated as "30" below).

Figure 8:
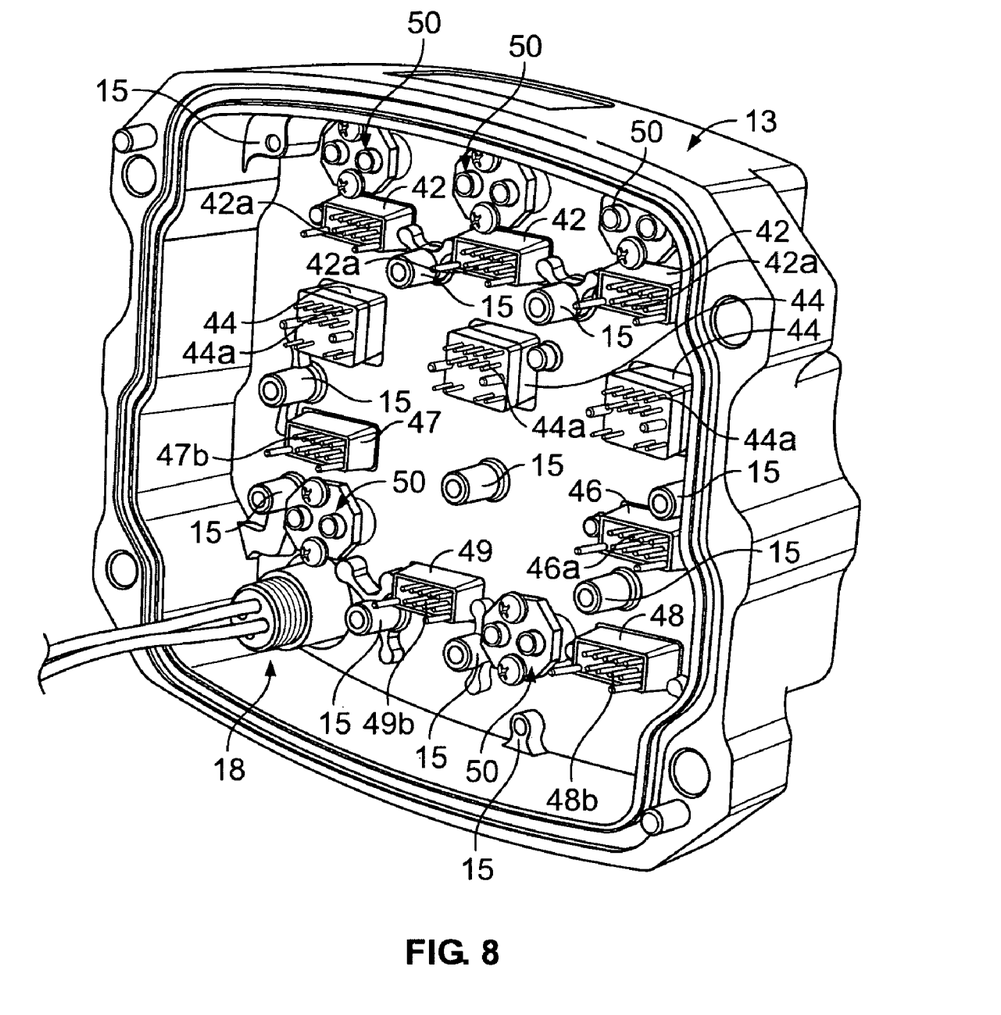
FIG. 8 is a rear elevational view of the end cap for the device of FIG. 1.

The end cap assembly 12 includes an end cap 13 having a face 14 including a plurality of apertures, generally illustrated as 16. Apertures 16 include: (i) apertures 16a for exposing and being illuminated by LEDs; (ii) apertures 16b for providing openings for interface connectors related to console wireless mobile interface card (WMIC); (iii) apertures 16c for interface connectors related to fast ethernet (FE) ports; (iv) apertures 16d for interface connectors related to Aux mobile access router card (MARC); (v) aperture 16e for interface connectors related to console MARC; and (vi) apertures 16f and 16g for interface connectors related to serial ports. A power connector 18 is conveniently disposed on the end cap 13. The power connector 18 may be purchased commercially from Tyco under the product name CPC 11-4 796095-2 (4 pin circular)). As best shown in FIG. 8, the end cap 13 includes a plurality of internally threaded receptacles 15.

The end cap assembly 12 also includes a plurality of plugs or connectors, generally illustrated as 40. As best shown in FIGS. 7 and 8, connectors 40 comprises: (i) sockets 42 having rear pins 42a; (ii) connector ports 44 terminating in rear pins 44a; (iii) plug 46 having front pins 46a and rear pins 46b; (iv) socket 47 having rear pins 47a; (v) plug 48 having front pins 48a and rear pins 48b; and (vi) plug 49 having front pins 49a and rear pins 49b. As further best shown in FIGS. 7 and 8, sockets 42, connector ports 44, plug 46, socket 47, plug 48 and plug 49 respectively lodge in apertures 16b, aperture 16c, aperture 16d, aperture 16e, aperture 16f, and aperture 16g. Signals passing through the connectors 40 are subsequently transmitted to the mobile interface card (MIC) stack assembly 60 (including the wiring board 62). The MIC stack assembly 60 may then reroute the signals (e.g., LED, serial, fast ethernet, console, and auxiliary) back out of the connectors 40 for transmission to other network devices. Sockets 42 may be purchased commercially from Amphenol under the product name P-MDB-E09SA-755 (DB9 socket). Connector ports 44 may be purchased commercially from Amphenol under the product name P-MRJ-518X-XIX (RJ45 Jack). Plug 46 may be purchased commercially from Amphenol under the product name P-MDB-E09SA-755 (DB9 socket). Socket 47 may be purchased commercially from Amphenol under the product name P-MDB-E09SA-755 (DB9 socket). Plugs 47 and 48 (S232 DCE) may be purchased commercially from Amphenol under the product name P-MDB-E09SA-755 (DB9 socket). As best shown in FIG. 7, a light pipe assembly 50 may be disposed behind each of the apertures 16a to provide appropriately illumination.

Figure 9:
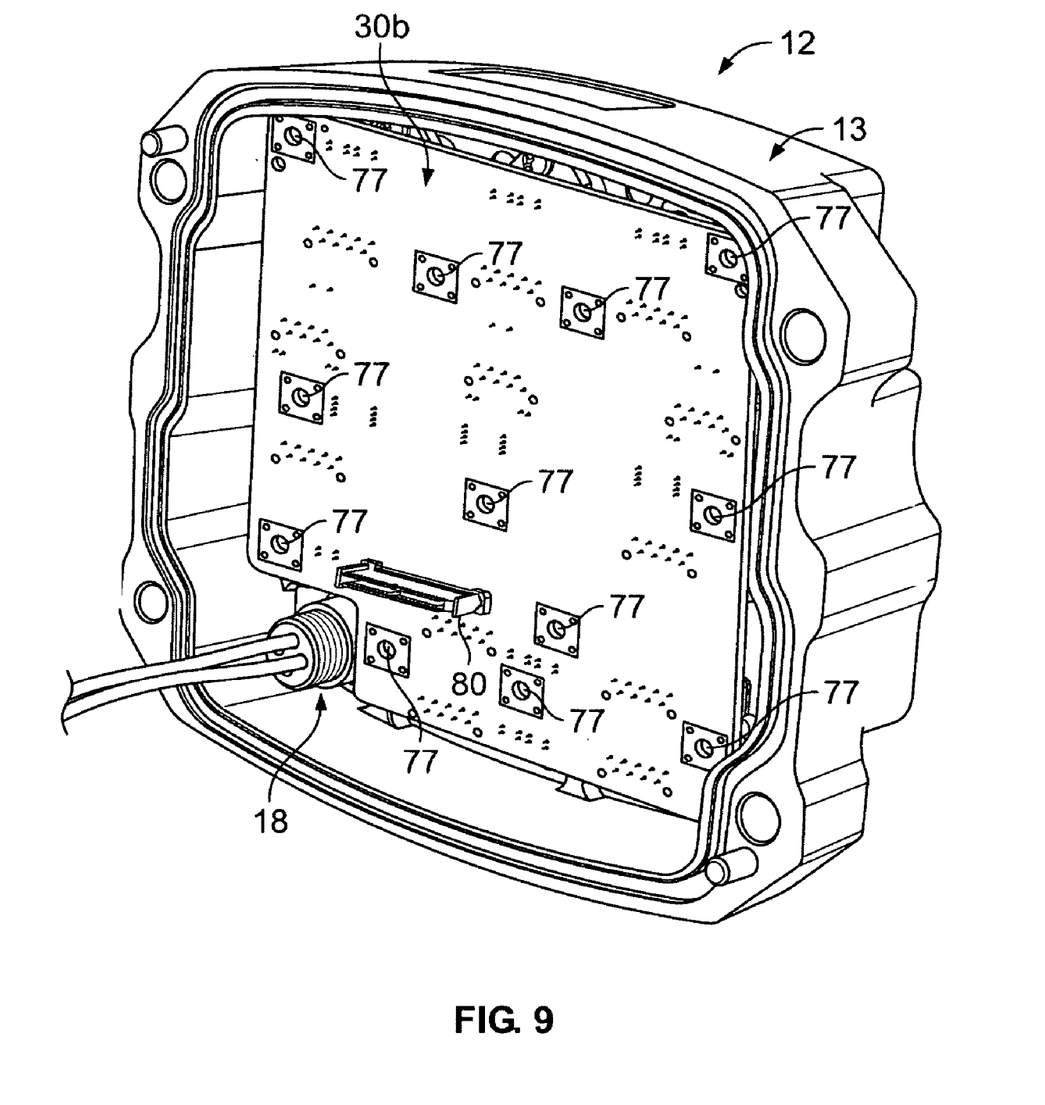
FIG. 9 is a rear elevational view of the wiring card electrically coupled to the appropriate components extending into and/or on the inside face of the end cap of the device of FIG. 1.
Figure 10:
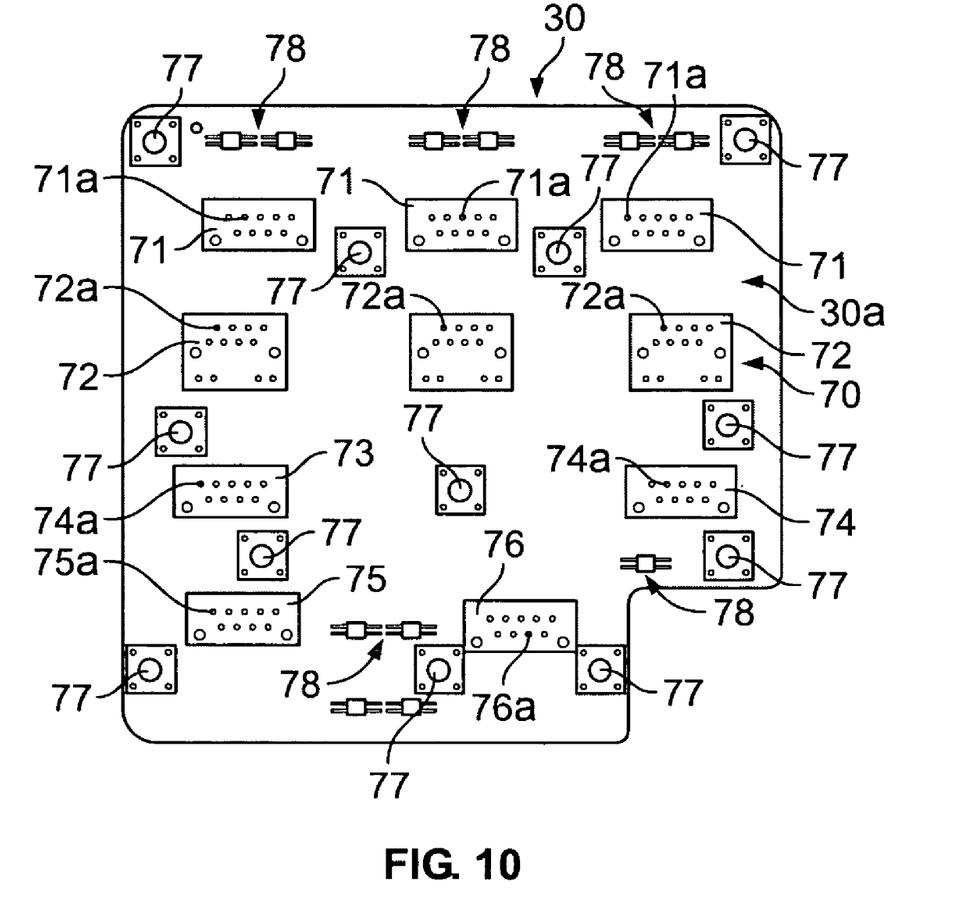
FIG. 10 is an elevational view of the rear face of the wiring card which electrically couples to the MIC stack assembly within the body of the device.

The end cap assembly 12 also includes a wiring card 30 having a front face 30a and a rear face 30b. A plurality of connector adaptors, generally illustrated as 70, is disposed on the front face 30a. Connector adaptors 70 include: (i) connector adaptors 71 having openings 71a for slidably receiving rear pins 42a of sockets 42; (ii) connector adaptors 72 having openings 72a for slidably receiving rear pins 44a of connector ports 44; (iii) connector adaptor 73 having openings 73a for slidably receiving rear pins 46b of plug 46; (iv) connector adaptor 74 having openings 74a for slidably receiving rear pins 47a of socket 47; (v) connector adaptor 75 having openings 75a for slidably receiving rear pins 48a of plug 48; and (vi) connector adaptor 76 having openings 76a for slidably receiving rear pins 49 of plug 49. The wiring card 30 also includes a plurality of circuitries 78 for electrically mating with respective light pipe assemblies 50, and a plurality of openings 77 for slidably receiving the receptacles 15. Disposed on the rear face 30b of the wiring card 30 is an interposer board 80. All signals (e.g., LED, serial, fast ethernet, console, and auxiliary) emanating from or through the plurality of plugs or connectors 40 are routed to the interposer board 80, which, in one embodiment is available commercially from Hirose under the product name Hirose 30 mm stack height IT1 168 pin series connector. From the interposer board 80 all signals are transmitted to the MIC stack assembly 60. As previously indicated, the MIC stack assembly 60 may subsequently route the signals out of the connectors 40 in the same manner as the signals were transmitted to the MIC stack assembly 60 (i.e., through the wiring board 62, through the interposer board 80, through the wiring card 70, and through the connectors 40).

Practice of various embodiments of the present invention provides an end cap assembly 12 for a router which allows 90% of the router design to remain fixed regardless of the use of the router. The only change to the router would be the end cap assembly 12 and/or the input/output circuit card assembly (i.e., the wiring card 30). The wiring card 30 is unique for each type of end cap assembly 12, but the interface (i.e., the wiring board 62) between the wiring card 30 and the MIC assembly 60 is common for all deployment scenarios. Thus, the actual deployment configuration would not be determined until installation of the end cap assembly 12. The production line would essentially build only one type of router unit until the last step at which time the appropriate end cap assembly 12 would be installed. In addition, a customer could order the end cap assembly 12 and make any particular desired change (e.g., changing the wiring card 30) to satisfy the customer's end use, particularly if there could be changes in the operating environment to which the router would be subjected. Embodiments of the invention achieve this by taking all signals (e.g., LED, serial, fast ethernet, console, and auxiliary) and routing them to a common interface (e.g., the interposer board 80, a 168 pin connector) on the wiring card 30 which is part of the end cap assembly 12.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any directional arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A router for routing network data through a network, the router comprising:

a modular end cap assembly which includes an end cap, a wiring card disposed in the end cap assembly and having an interposer board, the end cap assembly comprising a plurality of connectors that are used for passing network transmissions of different types and are coupled to a face of the end cap using apertures included in the face of the end cap, the connectors being further coupled to the wiring card using connector adaptors included in the wiring card for routing all network transmissions such that all network transmissions passing through the connectors are routed to the interposer board;

a modular mobile interface card (MIC) stack assembly that is distinct from the modular end cap assembly, and which includes a wiring board, the modular MIC stack assembly receiving all network transmissions from the connectors and rerouting the network transmissions back out of the connectors for transmission to other network devices; and the wiring board being coupled to the interposer board disposed in the wiring card and the coupling forming a only data link between the modular end cap assembly and the modular MIC stack assembly such that all network transmissions passing between the connectors and the modular MIC stack assembly are routed through the wiring board and the interposer board, the wiring board and the modular MIC stack assembly being common for multiple deployment scenarios of the router.

2. A method for routing network data with a router through a network, comprising:

processing with at least one connector a plurality of network transmissions through a modular end cap assembly, said modular end cap assembly including an end cap and a wiring card disposed in the end cap assembly and having an interposer board, the end cap assembly comprising a plurality of connectors that are used for passing first network transmissions of different types and are coupled to a face of the end cap using apertures included in the face of the end cap, the connectors being further coupled to the wiring card using connector adaptors included in the wiring card;

routing with said connectors and the wiring card the first network transmissions of different types to the interposer board, the interposer board configured to route network transmissions of different types; and receiving with the wiring card processed network transmissions of different types from the interposer board, the processed network transmissions being associated with the first network transmissions, the processed network transmissions being rerouted through the connectors for transmission to other network devices.

3. The method of claim 2, the method additionally comprising transmitting with the interposer board the first network transmissions to a wiring board included in a modular mobile interface card (MIC) stack assembly that is distinct from the modular end cap assembly, and receiving with the interposer board the processed network transmissions from the wiring board.

4. The method of claim 3, the method additionally comprising transmitting with the wiring board the first network transmissions to the MIC stack assembly, and receiving with the wiring board the processed network transmissions from the MIC stack assembly, the processed network transmissions being processed by the MIC stack assembly.

5. The method of claim 2 wherein said wiring card is disposed in said end cap.

6. The method of claim 5 wherein said end cap comprises an upstanding wall integrally secured to said face such that said end cap defines a receptacle.

7. The method of claim 6 wherein said wiring card is disposed within said receptacle.

8. A wireless router for routing network data through a network, the router comprising:

a modular end cap assembly which includes an end cap, a wiring card disposed in the end cap assembly and having an interposer board, the end cap assembly comprising a plurality of connectors that are used for passing network transmissions of different types and are coupled to a face of the end cap, the connectors being further coupled to the wiring card using connector adaptors included in the wiring card for routing all network transmissions such that all network transmissions passing through the connectors are routed to the interposer board;

a modular mobile interface card (MIC) stack assembly that interfaces with the end cap assembly and is distinct from the modular end cap assembly, and which includes a wiring board, the modular MIC stack assembly receiving all network transmissions from the connectors and rerouting the network transmissions back out of the connectors for transmission to other network devices; and the wiring board being coupled to the interposer board disposed in the wiring card and the coupling representing a only data link between the modular end cap assembly and the modular MIC stack assembly such that all network transmissions passing between the connectors and the modular MIC stack assembly are routed through the wiring board and the interposer board, the wiring board and the modular MIC stack assembly being common for multiple deployment scenarios of the wireless router.

9. The router of claim 8 wherein the face of the end cap has a structure defining a plurality of apertures, for insertion of the connector adaptors, the apertures being of different shapes corresponding to different shapes of the connector adaptors associated with network transmissions of different types.

10. The router of claim 9 wherein said end cap comprises an upstanding wall integrally secured to said face such that said end cap defines a receptacle.

11. The router of claim 10 wherein said wiring card is disposed within said receptacle.

12. The wireless router of claim 8 wherein the face of the end cap has a structure defining a plurality of apertures wherein said connectors are disposed, the connectors being of different shapes that represent network transmissions of different types.

13. The wireless router of claim 12 wherein said end cap comprises an upstanding wall integrally secured to said face such that said end cap defines a receptacle.

14. The wireless router of claim 13 wherein said wiring card is disposed within said receptacle.

* * * * *